United States Patent
Spangler (10) Patent No.: US 9,845,693 B2
(45) Date of Patent: *Dec. 19, 2017

(54) OVERLAPPING HERRINGBONE FILMHOLE PATTERNED SURFACES

(71) Applicant: United Technologies Corporation, Hartford, CT (US)

(72) Inventor: Brandon W. Spangler, Vernon, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 185 days.

This patent is subject to a terminal disclaimer.

(21) Appl. No.: 14/822,334

(22) Filed: Aug. 10, 2015

(65) Prior Publication Data

US 2017/0044913 A1  Feb. 16, 2017

(51) Int. Cl.
  *F01D 9/04*  (2006.01)
  *F01D 25/12*  (2006.01)
  (Continued)

(52) U.S. Cl.
  CPC ............. *F01D 9/042* (2013.01); *F01D 5/186* (2013.01); *F01D 9/065* (2013.01); *F01D 25/12* (2013.01);
  (Continued)

(58) Field of Classification Search
  CPC .......... F01D 5/186; F01D 5/187; F01D 9/065; F05D 2260/202; F05D 2240/121;
  (Continued)

(56) References Cited

U.S. PATENT DOCUMENTS

| 3,527,543 A | * | 9/1970 | Howald | F01D 5/186 415/115 |
| 2013/0205791 A1 | * | 8/2013 | Mongillo, Jr. | F01D 5/186 60/754 |

(Continued)

FOREIGN PATENT DOCUMENTS

| EP | 3059391 | 8/2016 |
| WO | 2014007961 | 1/2014 |

OTHER PUBLICATIONS

Extended European Search Report dated Sep. 8, 2016 in European Application No. 16174055.0.

*Primary Examiner* — Nathaniel Wiehe
*Assistant Examiner* — Elton Wong
(74) *Attorney, Agent, or Firm* — Snell & Wilmer L.L.P.

(57) ABSTRACT

A surface structure having an overlapping herringbone filmhole pattern is disclosed. For instance, the surface structure may have filmholes arranged in filmrows, each filmrow divided into groups of filmholes. A first group may be oriented to direct cooling air generally outward over a surface of the surface structure and a second group may be oriented to direct cooling air generally inward over a surface of the surface structure. Between the first group and the second group of filmholes in each filmrow, a transition region exists. A transition region filmrow group may be disposed within the transition region and may be collinear with or staggered relative to the first group and/or the second group. In this manner, the transition region filmrow group enhances the effectiveness of the cooling proximate to the transition region.

19 Claims, 7 Drawing Sheets

(51) Int. Cl.
  *F23R 3/00*  (2006.01)
  *F01D 9/06*  (2006.01)
  *F01D 5/18*  (2006.01)
(52) U.S. Cl.
  CPC .......... *F23R 3/002* (2013.01); *F05D 2240/11* (2013.01); *F05D 2240/81* (2013.01); *F05D 2260/202* (2013.01); *Y02T 50/672* (2013.01); *Y02T 50/676* (2013.01)
(58) Field of Classification Search
  CPC ......... F05D 2240/122; F05D 2240/303; F05D 2240/304; Y02T 50/676
  See application file for complete search history.

(56) References Cited

U.S. PATENT DOCUMENTS

2014/0369852 A1* 12/2014 Zhang .................... F01D 5/187
                                                        416/97 A
2016/0326882 A1* 11/2016 Spangler ................ F01D 5/186

\* cited by examiner

OVERLAPPING HERRINGBONE FILMHOLE PATTERNED SURFACES

STATEMENT REGARDING GOVERNMENT RIGHTS

This disclosure was made with government support under FA-8650-09-D-2923-0021 awarded by the United States Air Force. The government has certain rights in the disclosure.

FIELD

The present disclosure relates generally to surface structures of gas turbine engines, and more specifically, to surfaces having overlapping herringbone filmhole patterns.

BACKGROUND

In a gas turbine engine, surface structures may have filmholes to allow cooling air to pass from cavities inside the structures and out through the filmholes, cooling the surfaces. For instance, a blade outer air seal (BOAS), combustor panel, combustor liner, inboard vane platform, outboard vane platform, and other surface may have filmholes. Groups of filmholes may point in different directions. However, because the filmholes point in different directions, areas of the surface may not receive cooling air. Such areas may be insufficiently cooled and subject to early wear and/or failure.

SUMMARY

A surface structure with an overlapping herringbone filmhole pattern is disclosed. The surface structure may have a first filmrow. The first filmrow may include a first outward facing portion with filmholes oriented to direct cooling air leaving the filmholes outward of a reference edge and over a surface of the surface structure, a first inward facing portion with filmholes oriented to direct cooling air leaving the filmholes inward toward the reference edge and over the surface of the surface structure, and a first transition region with a first region at least one of equidistant from distal ends, centered relative to mesial ends, or overlapping the mesial ends of the first outward facing portion and the first inward facing portion. The surface structure may include a first transition region filmhole group located in the first transition region, wherein the first transition region filmhole group has filmholes oriented to direct cooling air leaving the filmholes at least one of outward relative to the reference edge and over the surface of the surface structure or inward relative to the reference edge and over the surface of the surface structure.

In any of the foregoing embodiments, the first transition region filmhole group may be collinear with the first outward facing portion. Moreover, in any of the foregoing embodiments, the first transition region filmhole group may be collinear with the first inward facing portion.

In any of the foregoing embodiments, a first outward facing portion group alignment line may be defined through a center of each filmhole of the first outward facing portion, wherein a first inward facing portion group alignment line is defined through a center of each filmhole of the first inward facing portion. Moreover, a first transition region filmhole group alignment line may be defined through a center of each filmhole of the first transition region filmhole group; the first inward facing portion group alignment line may be parallel to the first outward facing portion group alignment line, and the first transition region filmhole group alignment line may be coincident with the first inward facing portion group alignment line and is parallel to the first outward facing portion group alignment line.

In any of the foregoing embodiments, a first outward facing portion group alignment line may be defined through a center of each filmhole of the first outward facing portion, wherein a first inward facing portion group alignment line may be defined through a center of each filmhole of the first inward facing portion, a first transition region filmhole group alignment line may be defined through a center of each filmhole of the first transition region filmhole group, the first inward facing portion group alignment line may be parallel to the first outward facing portion group alignment line, and the first transition region filmhole group alignment line may be coincident with the first outward facing portion group alignment line and may be parallel to the first inward facing portion group alignment line.

In any of the foregoing embodiments, the surface structure may be at least one of an inner stator vane platform or an outer stator vane platform. In any of the foregoing embodiments, the surface structure may be a blade outer air seal.

In various embodiments, a surface structure may have an overlapping herringbone filmhole pattern, the overlapping herringbone filmhole pattern having a plurality of filmrows, each filmrow having an inward facing portion, an outward facing portion, and a transition region filmhole group.

In any of the foregoing embodiments, the transition region filmhole group may be collinear with at least one of the outward facing portion or the inward facing portion. In any of the foregoing embodiments, the outward facing portion may be staggered relative to the inward facing portion.

In any of the foregoing embodiments of the surface structure, an outward facing portion group alignment line may be defined through a center of each filmhole of the outward facing portion, an inward facing portion group alignment line may be defined through a center of each filmhole of the inward facing portion, a transition region filmhole group alignment line may be defined through a center of each filmhole of the transition region filmhole group, the inward facing portion group alignment line may be parallel to the outward facing portion group alignment line, and the transition region filmhole group alignment line may be coincident with the inward facing portion group alignment line and may be parallel to the outward facing portion group alignment line.

In any of the foregoing embodiments of the surface structure, an outward facing portion group alignment line may be defined through a center of each filmhole of the outward facing portion, an inward facing portion group alignment line may be defined through a center of each filmhole of the inward facing portion, a transition region filmhole group alignment line may be defined through a center of each filmhole of the transition region filmhole group, the inward facing portion group alignment line may be parallel to the outward facing portion group alignment line, and the transition region filmhole group alignment line may be coincident with the outward facing portion group alignment line and is parallel to the inward facing portion group alignment line.

In any of the foregoing embodiments, the surface structure may be at least one of an inner stator vane platform or an outer stator vane platform. In any of the foregoing embodiments, the surface structure may be a blade outer air seal.

In any of the foregoing embodiments of the surface structure according each filmrow may include an outward facing portion, wherein the outward facing portion has filmholes oriented to direct cooling air leaving the filmholes outward of a reference edge and over a surface of the surface structure, the inward facing portion, wherein the inward facing portion has filmholes oriented to direct cooling air leaving the filmholes inward toward the reference edge and over the surface of the surface structure, and a transition region. The transition region may include a first region equidistant from distal ends of the outward facing portion and the inward facing portion. The transition region filmhole group may be is collinear with at least one of the outward facing portion and the inward facing portion and located in the transition region, wherein the transition region filmhole group has filmholes oriented to direct cooling air leaving the filmholes one of outward relative to the reference edge and over the surface of the surface structure or inward relative to the reference edge and over the surface of the surface structure.

A method of forming a surface structure is having an overlapping herringbone filmhole pattern in the surface structure is disclosed. The method may include forming a first outward facing portion having filmholes oriented to direct cooling air leaving the filmholes outward of a reference edge and over a surface of the surface structure, forming a first inward facing portion with filmholes oriented to direct cooling air leaving the filmholes inward toward the reference edge and over the surface of the surface structure, and forming a first transition region filmhole group located in a first transition region. In various embodiments, the first transition region filmhole group includes filmholes oriented to direct cooling air leaving the filmholes at least one of outward relative to the surface structure and over the surface of the surface structure or inward relative to the surface structure and over the surface of the surface structure.

In any of the foregoing embodiments, the first transition region filmhole group may be collinear with at least one of: the first outward facing portion and the first inward facing portion.

In any of the foregoing embodiments, the first transition region may have a first region at least one of equidistant from distal ends, centered relative to mesial ends, or overlapping the mesial ends of the first outward facing portion and the first inward facing portion.

In any of the foregoing embodiments, a first outward facing portion group alignment line may be defined through a center of each filmhole of the first outward facing portion, and a first inward facing portion group alignment line is defined through a center of each filmhole of the first inward facing portion. A first transition region filmhole group alignment line may be defined through a center of each filmhole of the first transition region filmhole group. The first inward facing portion group alignment line may be parallel to the first outward facing portion group alignment line, and the first transition region filmhole group alignment line may be coincident with the first inward facing portion group alignment line and may be parallel to the first outward facing portion group alignment line.

In any of the foregoing embodiments, a first outward facing portion group alignment line may be defined through a center of each filmhole of the first outward facing portion, and a first inward facing portion group alignment line may be defined through a center of each filmhole of the first inward facing portion. A first transition region filmhole group alignment line may be defined through a center of each filmhole of the first transition region filmhole group, the first inward facing portion group alignment line may be parallel to the first outward facing portion group alignment line, and the first transition region filmhole group alignment line may be coincident with the first outward facing portion group alignment line and may be parallel to the first inward facing portion group alignment line.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "pressure side" of a structure means the side of the structure having a shorter length and/or proximate to slower moving fluid and/or fluid at higher pressure as compared to the "suction side" of the structure. "Suction side" of a structure means the side of the structure having a longer length and/or proximate to faster moving fluid and/or fluid at a lower pressure as compared to the "pressure side" of the structure.

Figure 1:
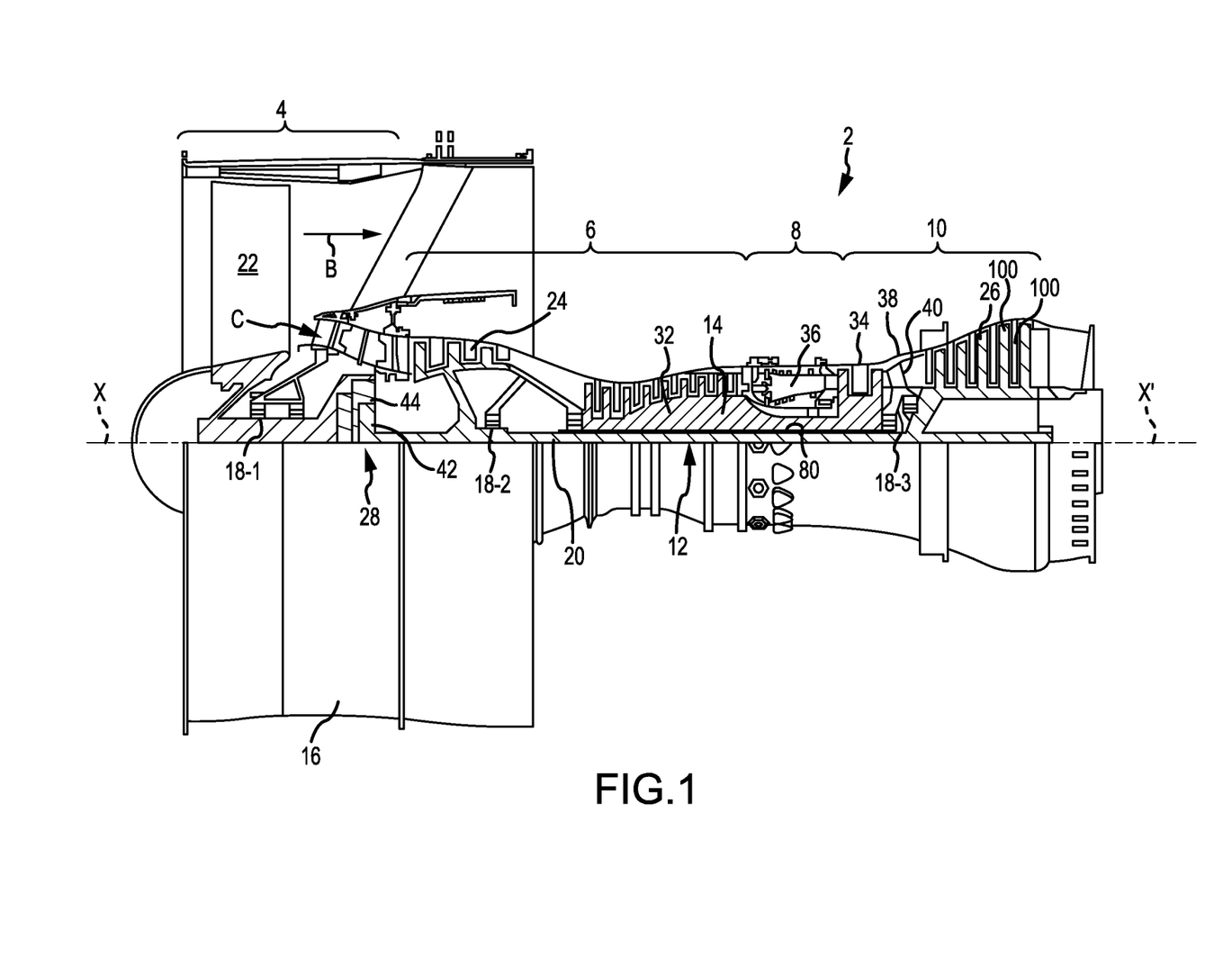
FIG. 1 illustrates a cross-sectional view of an exemplary gas turbine engine, according to various embodiments.
Figure 2:
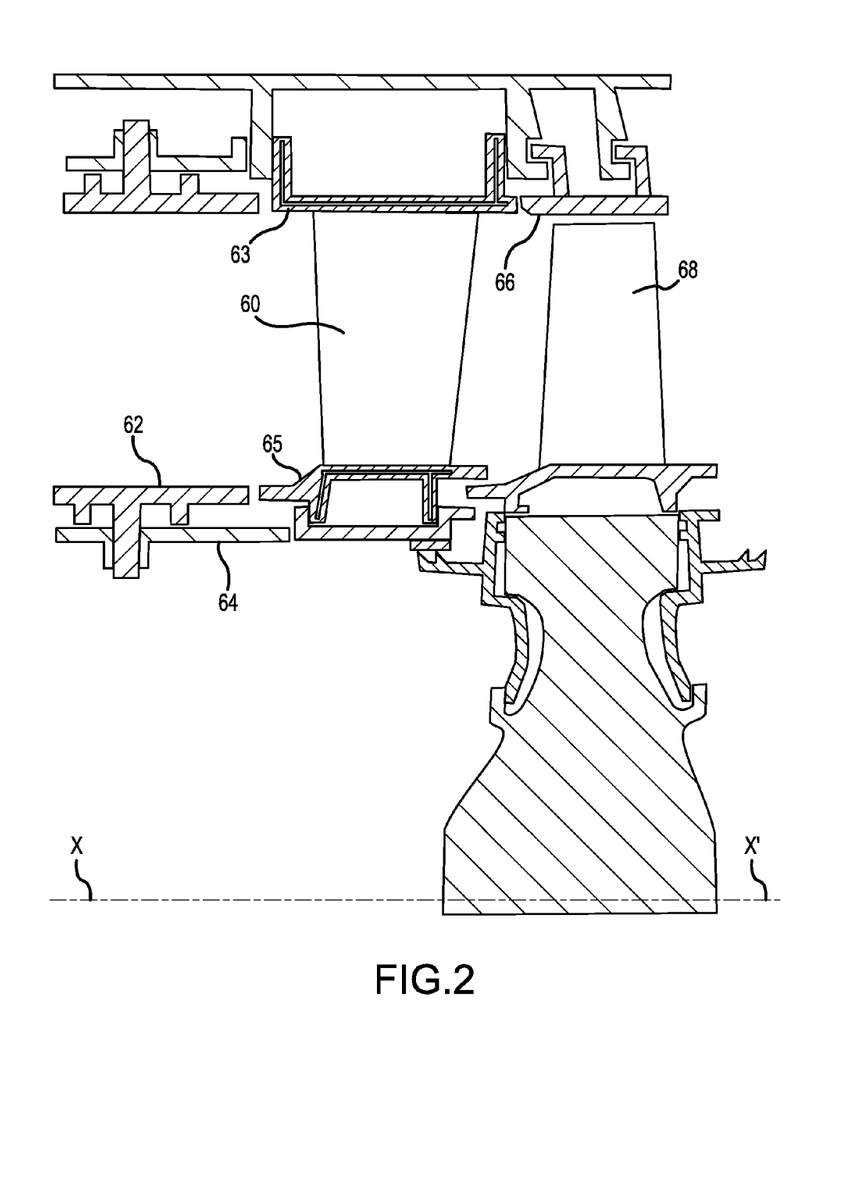
FIG. 2 illustrates example surface structures of an exemplary gas turbine engine, according to various embodiments.

With reference to FIGS. 1 and 2, an exemplary gas turbine engine 2 is provided. Gas turbine engine 2 is a two-spool turbofan that generally incorporates a fan section 4, a compressor section 6, a combustor section 8 and a turbine section 10. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 is, for example, a high-bypass geared aircraft engine. The bypass ratio of gas turbine engine 2 is optionally greater than about six (6). The bypass ratio of gas turbine engine 2 is optionally greater than ten (10). Geared architecture 28 is an epicyclic gear train, such as a star gear system, e.g., sun gear in meshing engagement with a plurality of star gears supported by a carrier and in meshing engagement with a ring gear, or other gear system. Geared architecture 28 has a gear reduction ratio of greater than about 2.3 and low pressure turbine section 26 has a pressure ratio that is greater than about 5. The bypass ratio of gas turbine engine 2 is greater than about ten (10:1). The diameter of fan 22 is significantly larger than that of the low pressure compressor section 24, and the low pressure turbine section 26 has a pressure ratio that is greater than about 5:1. Low pressure turbine section 26 pressure ratio is measured prior to inlet of low pressure turbine section 26 as related to the pressure at the outlet of low pressure turbine section 26 prior to an exhaust nozzle. It should be understood, however, that the above parameters are exemplary of a suitable geared architecture engine and that the present disclosure contemplates other turbine engines including direct drive turbofans.

The next generation of turbofan engines is designed for higher efficiency, which is associated with higher pressure ratios and higher temperatures in the high speed spool 14 and other engine sections. These higher operating temperatures and pressure ratios create operating environments that cause thermal loads that are higher than thermal loads conventionally encountered. Operating conditions in high pressure compressor section 32 are often approximately 1400° F. (approximately 760° C.) or more, and operating conditions in combustor 36 are often higher. Moreover, prior filmhole arrangements permit regions of localized temperature excursions, such as due to regions that are insufficiently cooled due to the orientation of the filmholes. Various systems to address these challenges are presented herein.

Surface structures may have filmholes arranged in rows and each row may have at least one filmhole pointing in an outward direction and at least one filmhole pointing in an inward direction relative to a reference edge of the surface structure. Various regions of the surface structure may rely on the convection in the filmhole to reduce temperature of the surface structure and/or other proximate structures; however, multiple rows of filmholes often transition from groups of filmholes pointing outwardly and groups of filmholes pointing inwardly at various positions. As such, by staggering the transition of multiple rows of filmholes from groups pointing outward and groups pointing inward, the effectiveness of the convective cooling proximate to the transitions may be enhanced.

Stated differently, the present disclosure contemplates considering filmhole positioning. For instance, for filmholes arranged in rows ("filmrows"), each filmrow is divided into groups of filmholes. A first group may be oriented to direct cooling air leaving the filmhole generally outward relative to a reference edge of the surface structure over a surface of the surface structure, whereas a second group may be oriented to direct cooling air leaving the filmhole generally inward relative to a reference edge of the surface structure over a surface of the surface structure. Between the first group and the second group of filmholes in each filmrow, a transition region exists. The transition region is the space between the first group and the second group where the holes transition from pointing outward to pointing inward, resulting in diminished cooling coming from these two groups of filmholes. For instance, the transition region is bounded at one end by filmholes oriented to direct cooling air leaving the filmholes generally outward relative to a reference edge of the surface structure and at the other end by filmholes oriented to direct cooling air leaving the filmholes generally inward relative to a reference edge of the surface structure of the surface structure. Each group of filmholes may define a group alignment line that extends through the center of each filmhole of the group of filmholes.

Thus, one may stagger the second group of filmholes so that first group alignment line of the first group of filmholes does not coincide with the second group alignment line of the second group of filmholes. A filmrow may include a third group of filmholes, the transition region filmhole group. In various embodiments, the transition region filmhole group has a group alignment line that coincides with the group alignment line of one of the first group of filmholes and the second group of filmholes. At least one filmhole of the transition region filmhole group is positioned inward of an orthogonal line to the group alignment line that is not coincident with the group alignment line of the transition region filmhole group, the orthogonal line coinciding with the center of a filmhole along the group alignment line that is not coincident with the group alignment line of the transition region filmhole group. In other words, the transition region filmhole group contains holes that overlap one of the first and second group of filmholes. The transition region filmhole group may include filmholes that are outward of the innermost hole of one of the first and second group of filmholes, and also inward of the outermost hole of the other of the first and second group of filmholes. In this manner, the transition region filmhole group may overlap one or both of the first and second group of filmholes.

In further embodiments, the second group of filmholes is collinear with the first group of filmholes so that first group alignment line of the first group of filmholes coincides with the second group alignment line of the second group of filmholes. A filmrow may include a third group of filmholes, the transition region filmhole group. The transition region filmhole group has a group alignment line that is staggered relative to the group alignment line of both of the first group of filmholes and the second group of filmholes. At least one filmhole of the transition region filmhole group is positioned inward and at least one filmhole of the transition region filmhole group is positioned outward of a line coincident with the center of a transition region and orthogonal to the group alignment line of the first group of filmholes and/or the second group of filmholes. As such, the transition region filmhole group is proximate to the first group of filmholes and the second group of filmholes and centered about mesial ends of the first group of filmholes and the second group of filmholes, resulting in the transition region filmhole group overlapping the first and second filmhole groups. In further embodiments, the transition region filmhole group is overlapping the mesial ends of the first group of filmholes and the second group of filmholes, but is not centered about mesial ends of the first group of filmholes and the second group of filmholes.

Staggering of the first group of filmholes and the second group of filmholes of a filmrow and implementation of a transition region filmhole group aligned with one of the first group or second group of filmholes tends to enhance the effectiveness of the cooling proximate to the transition region of the filmrow by permitting the cooling air flowing from the transition region filmhole group to convectively cool the transition region and/or provide additional film to the transition region.

Similarly, aligning of the first group of filmholes and the second group of filmholes, and implementation of a transition region filmhole group staggered relative to the first group or second group of filmholes tends to enhance the effectiveness of the cooling proximate to the transition region of the filmrow by permitting the cooling air flowing from the transition region filmhole group to convectively cool the transition region and/or provide additional film to the transition region.

With reference to FIGS. 1 and 2, an airfoil 100 of an engine 2 may comprise a rotor blade 68 or a stator vane 60. The engine 2 may comprise various surface structures. For instance, the stator vane 60 may have surface structure such as an inner stator vane platform 65, or an outer stator vane platform 63. A combustor panel 62 may join a combustor liner 64 and may be a surface structure. Similarly, a blade outer air seal (BOAS) 66 may be a surface structure. Thus, a surface structure as discussed herein may comprise an inner stator vane platform 65, an outer stator vane platform 63, a combustor panel 62, a BOAS 66, and/or another structure as desired. While various aspects are described herein with reference to such features as overlapping herringbone filmhole pattern 52 (with brief reference to FIGS. 4A-5B), such aspects may be incorporated into other surfaces as desired.

Moreover, an overlapping herringbone filmhole pattern 52 may comprise various arrangements. Though discussed in greater detail below, an overlapping herringbone filmhole pattern 52 may comprise a coaxially overlapped pattern 74 (FIGS. 4A, 5A) or an adjacently overlapped pattern 75 (FIGS. 4B, 5B), or various other patterns, for instance, a linear pattern as depicted in first circumferentially outward portion filmhole group 73 and second circumferentially outward portion filmhole group 77 of FIG. 3.

Figure 4A:
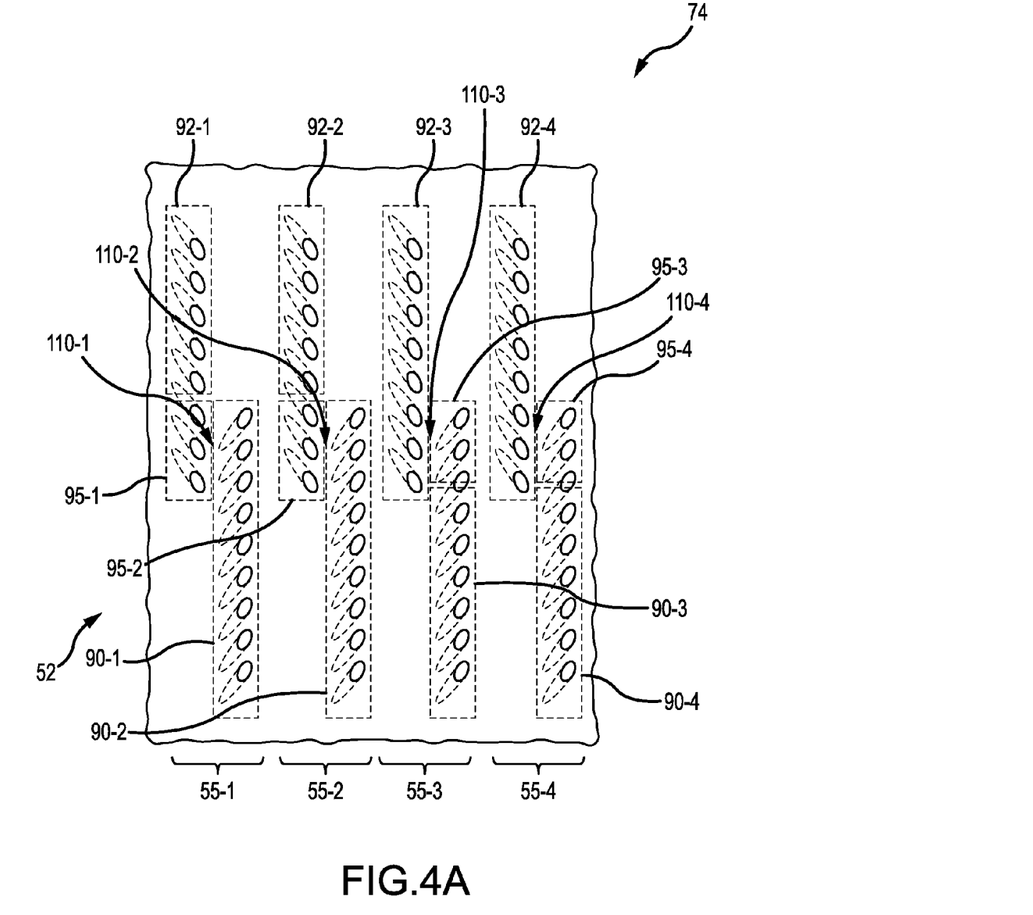
FIG. 4A illustrates an example overlapping herringbone filmhole pattern comprising a coaxially overlapped pattern, according to various embodiments.
Figure 4B:
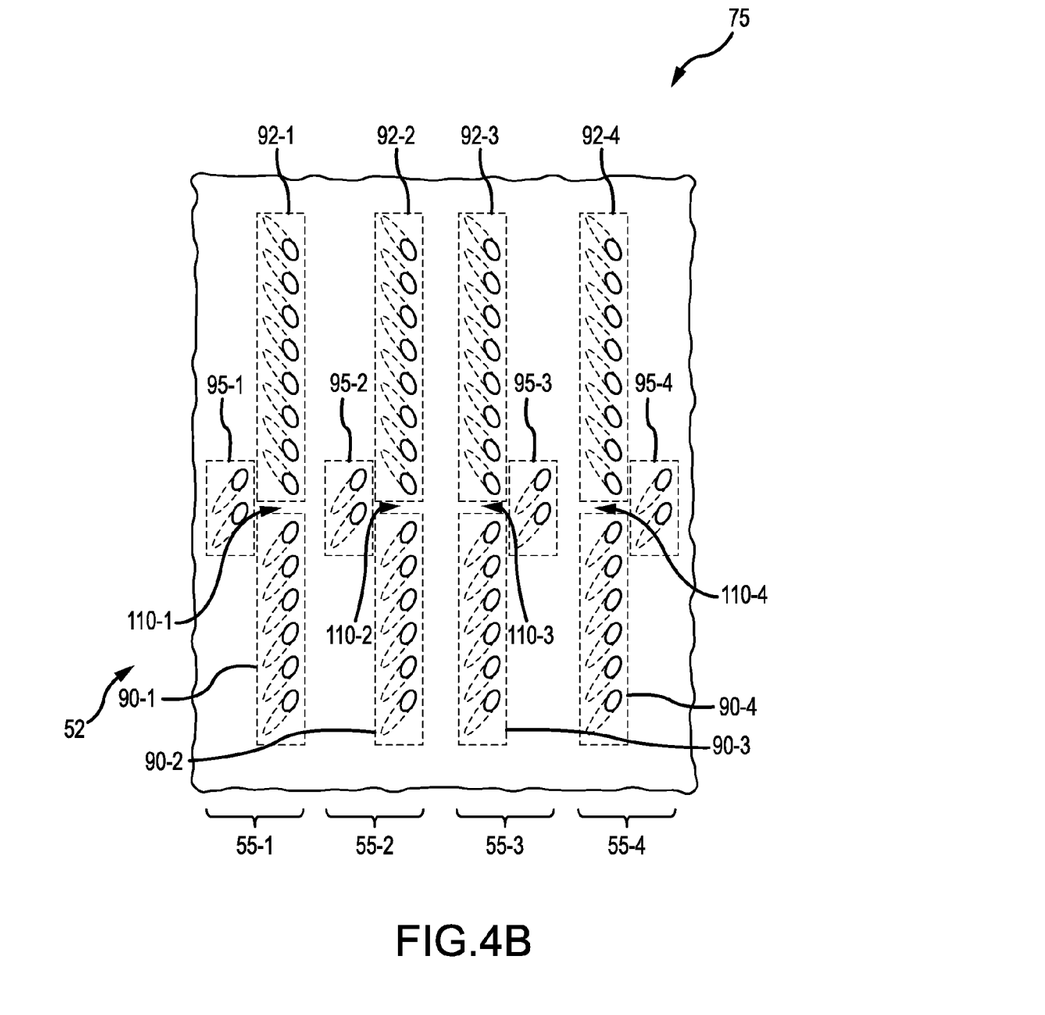
FIG. 4B illustrates an example overlapping herringbone filmhole pattern comprising an adjacently overlapped pattern, according to various embodiments.
Figure 5A:
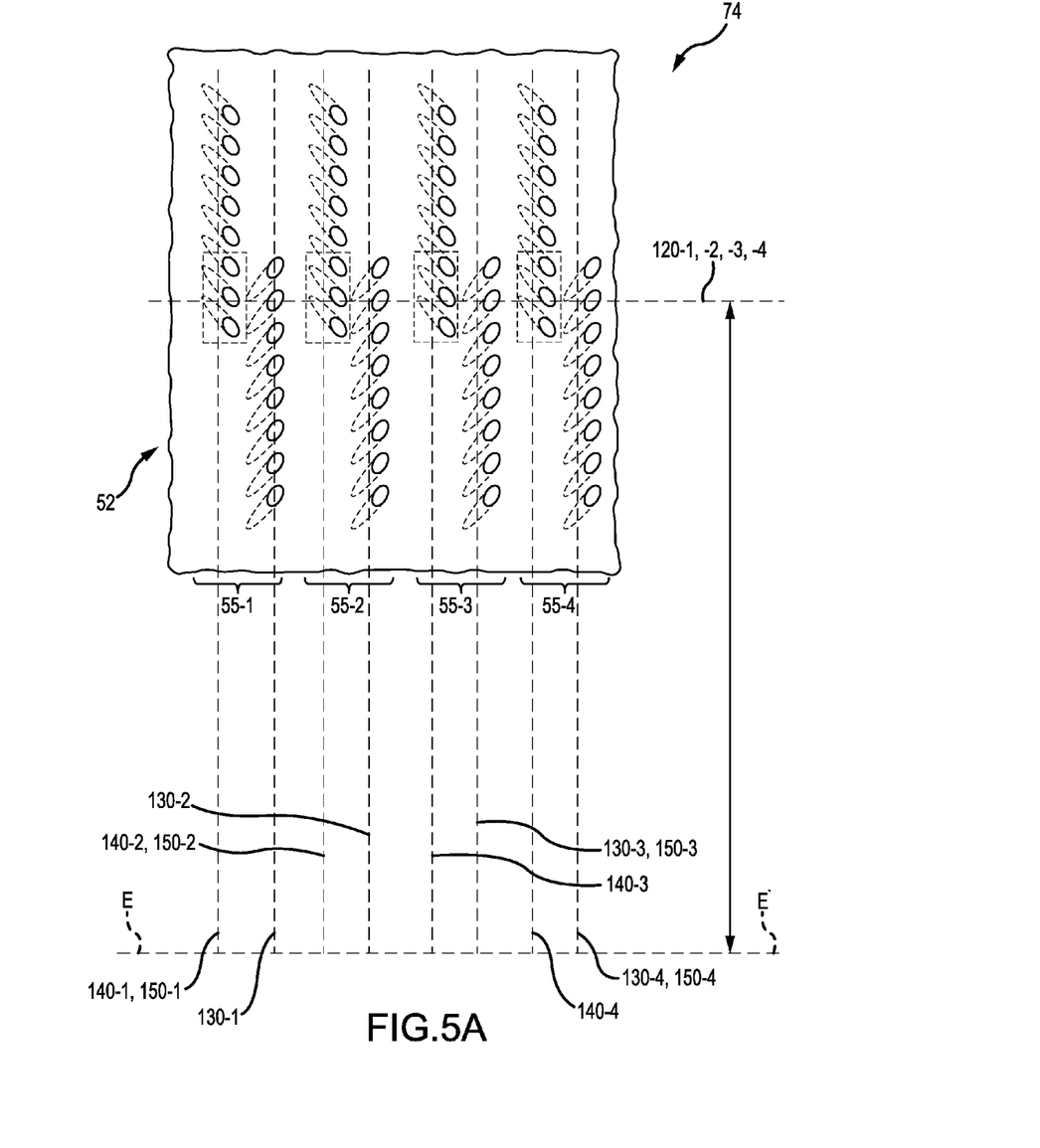
FIG. 5A illustrates an example surface structure having an overlapping herringbone filmhole pattern according to FIG. 4A, with emphasis on various group alignment lines and transition region positions, according to various embodiments.

With reference now to FIGS. 4A-B and 5A-B, an overlapping herringbone filmhole pattern 52 is disclosed. In various embodiments, the overlapping herringbone filmhole pattern 52 may comprise an arrangement of filmholes into filmrows 55 configured to cool the surface structure. For instance, the overlapping herringbone filmhole pattern 52 may comprise one or more filmrows 55. The overlapping herringbone filmhole pattern 52 may comprise a first filmrow 55-1, a second filmrow 55-2, a third filmrow 55-3, and a fourth filmrow 55-4. While four filmrows are depicted in FIGS. 4A-B and 5A-B for illustration purposes, one may appreciate that any number of filmrows configured to accomplish a desired cooling on a desired surface structure may be implemented, and any grouping of filmrows may comprise linear arrangements and may comprise arcuate or otherwise non-linear arrangements. With reference specifically to FIGS. 4A and 5A, an overlapping herringbone filmhole pattern 52 may comprise a coaxially overlapped pattern 74, and with specific reference to FIGS. 4B and 5B, an overlapping herringbone filmhole pattern 52 may comprise an adjacently overlapped pattern 75.

With reference to FIGS. 4A-B and 5A-B, each filmrow 55-1, 55-2, 55-3, 55-4 may comprise an outward facing portion 90 (e.g., "first group of filmholes") and an inward facing portion 92 (e.g., "second group of filmholes"). For instance, the filmholes of each filmrow may be arranged into a row with filmholes oriented to direct cooling air from a channel inside the surface structure through and out of the surface of the surface structure. Relative to a reference edge E-E' of the surface structure, the outward facing portion 90 may comprise filmholes oriented to direct cooling air generally away from the reference edge E-E'. Similarly, the inward facing portion 92 may comprise filmholes oriented to direct cooling air generally toward the reference edge E-E'. Stated differently, the inward facing portion 92 may comprise filmholes oriented to direct cooling air in a direction with at least a partial vector component in an opposite direction of the cooling air from the outward facing portion 90. The outward facing portion 90 and the inward facing portion 92 may comprise filmholes oriented to direct cooling air in generally opposing directions, or in directions each having at least a partial vector component that is opposed to the other portion. Furthermore, each filmrow 55-1, 55-2, 55-3, and 55-4 may further comprise a transition region filmhole group 95 (e.g., "third group of filmholes") made up of filmholes that overlap at least one of the first and second group of holes. The transition region filmhole group 95 may be arranged into a row with filmholes oriented to direct cooling air from a channel inside the surface structure through and out of the surface of the surface structure generally toward the corresponding transition region 110-1, 110-2, 110-3, or 110-4. As used herein, a row may comprise a linear arrangement. In further embodiments, as used herein, a row may comprise an arcuate arrangement, or a compound curve, or any non-linear arrangement as desired.

Because each filmrow 55-1, 55-2, 55-3, 55-4 may comprise an outward facing portion 90 and an inward facing portion 92 and a transition region filmhole group 95, the first filmrow 55-1 may comprise a first outward facing portion 90-1 and a first inward facing portion 92-1 and a first transition region filmhole group 95-1, the second filmrow 55-2 may comprise a second outward facing portion 90-2 and a second inward facing portion 92-2 and a second transition region filmhole group 95-2, the third filmrow 55-3 may comprise a third outward facing portion 90-3 and a third inward facing portion 92-3 and a third transition region filmhole group 95-3, and the fourth filmrow 55-4 may comprise a fourth outward facing portion 90-4 and a fourth inward facing portion 92-4 and a fourth transition region filmhole group 95-4.

Figure 5B:
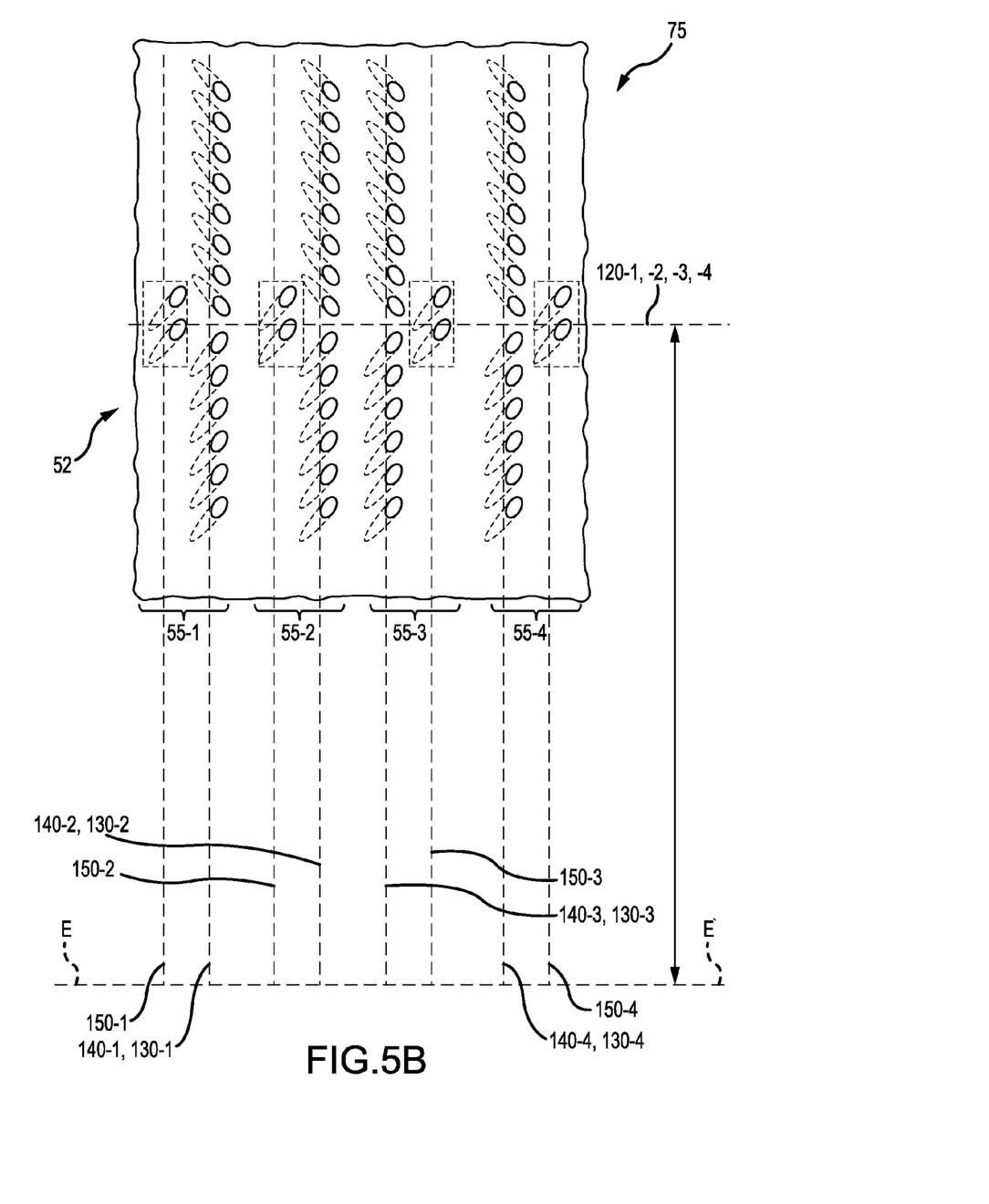
FIG. 5B illustrates an example surface structure having an overlapping herringbone filmhole pattern according to FIG. 4B, with emphasis on various group alignment lines and transition region positions, according to various embodiments.

With reference to FIGS. 4A and 5A depicting an overlapping herringbone filmhole pattern 52 comprising a coaxially overlapped pattern 74 and FIGS. 4B and 5B depicting an overlapping herringbone filmhole pattern 52 comprising an adjacently overlapped pattern 75, each filmrow 55-1, 55-2, 55-2, 55-4 may further comprise a transition region. For example, first filmrow 55-1 may comprise a first transition region 110-1, second filmrow 55-2 may comprise a second transition region 110-2, third filmrow 55-3 may comprise a third transition region 110-3 and forth filmrow 55-4 may comprise a fourth transition region 110-4.

With particular reference to the adjacently overlapped pattern 75 of FIGS. 4B and 5B, a transition region may comprise a region at least one of equidistant from distal ends and centered relative to mesial ends of an outward facing portion of a filmrow and an inward facing portion of the same filmrow and having the transition region filmhole group of the filmrow disposed therein.

With particular reference to the coaxially overlapped pattern 74 of FIGS. 4A and 5A, a transition region may comprise a region overlapping a portion of one or more of the outward facing portion and inward facing portion of a filmrow and having the transition region filmhole group of the filmrow disposed therein.

With particular reference to the adjacently overlapped pattern 75 of FIGS. 4B and 5B, first transition region 110-1 may be a region at least one of equidistant from distal ends and centered relative to mesial ends of first inward facing portion 92-1 and first outward facing portion 90-1 of the first filmrow 55-1 and/or with reference to both the adjacently overlapped pattern 75 and the coaxially overlapped pattern 74 of FIGS. 4A and 5A, overlapping a portion of first inward facing portion 92-1 and/or first outward facing portion 90-1. Similarly and with similar reference to FIGS. 4A, 5A and 4B, 5B, second transition region 110-2 may be a region at least one of equidistant from distal ends and centered relative to mesial ends of second inward facing portion 92-2 and second outward facing portion 90-2 of the second filmrow 55-2 and/or overlapping a portion of second inward facing portion 92-2 and/or second outward facing portion 90-2. Third transition region 110-3 may be a region at least one of equidistant from distal ends and centered relative to mesial ends of third inward facing portion 92-3 and third outward facing portion 90-3 of the third filmrow 55-3 and/or overlapping a portion of third inward facing portion 92-3 and/or third outward facing portion 90-3. Fourth transition region 110-4 may be a region at least one of equidistant from distal ends and centered relative to mesial ends of fourth inward facing portion 92-4 and fourth outward facing portion 90-4 of the fourth filmrow 55-4 and/or overlapping a portion of fourth inward facing portion 92-4 and/or fourth outward facing portion 90-4.

With continued reference to FIGS. 4A-B and 5A-B, each filmrow may comprise a corresponding transition region position. For example, first filmrow 55-1 may comprise a first transition region position 120-1, second filmrow 55-2 may comprise a second transition region position 120-2, third filmrow 55-3 may comprise a third transition region position 120-3 and fourth filmrow 55-4 may comprise a fourth transition region position 120-4. A transition region position may comprise the distance of the center of the corresponding transition region from reference edge E-E' of the surface structure. Different transition regions may have different transition region positions, or may have the same transition region position. In various embodiments, a transition region position may comprise an arcuate alignment line, such as may have a point of inflection at the center of the transition region.

With reference to FIGS. 4A-B and 5A-B, each outward facing portion 90-1, 90-2, 90-3, 90-4 may have a corresponding outward facing portion group alignment line 130-1, 130-2, 130-3, 130-4 that is defined through the center of each filmhole of the outward facing portion 90-1, 90-2, 90-3, 90-4. Moreover, each inward facing portion 92-1, 92-2, 92-3, 92-4 may have a corresponding inward facing portion group alignment line 140-1, 140-2, 140-3, 140-4 that is defined through the center of each filmhole of the inward facing portion 92-1, 92-2, 92-3, 92-4.

With reference to FIGS. 4A and 5A, for a coaxially overlapped pattern 74, the outward facing portion group alignment line 130-1, 130-2, 130-3, 130-4 and the inward facing portion group alignment line 140-1, 140-2, 140-3, 140-4 of a filmrow 55-1, 55-2, 55-3, 55-4, may comprise parallel lines extending away relative to reference edge E-E' and lying in a plane of the surface of the surface structure, or with reference to FIGS. 4B and 5B, for an adjacently overlapped pattern 75, may comprise coincident lines extending away relative to reference edge E-E' and lying in a plane of the surface of the surface structure, or may comprise any orientation as desired. In various embodiments, a group alignment line may comprise an arcuate alignment line, such as may have a point of inflection at the center of the associated outward facing portion or inward facing portion, or may have a point of inflection outside the associated outward facing portion or inward facing portion, or may have no point of inflection.

With reference to FIGS. 4A-B and 5A-B, each transition region filmhole group 95-1, 95-2, 95-3, 95-4 may also have a transition region portion group alignment line 150-1, 150-2, 150-3, 150-4 that is defined through the center of each filmhole of the transition region filmhole group 95-1, 95-2, 95-3, 95-4. The transition region portion group alignment line 150-1, 150-2, 150-3, 150-4 may extend generally outward relative to the reference edge E-E'. The transition region portion group alignment line may comprise a linear line, or an arcuate line, or any orientation as desired. In various embodiments, the transition region portion group alignment line may have a point of inflection at the center of the associated transition region, or may have a point of inflection outside the associated transition region, or may have no point of inflection.

With reference to FIGS. 4A and 5A, for a coaxially overlapped pattern 74, the outward facing portion 90-1, 90-2, 90-3, 90-4 may be offset relative to the corresponding inward facing portion 92-1, 92-2, 92-3, 92-4 of the same filmrow 55-1, 55-2, 55-3, 55-4. In such embodiments, the transition region portion group alignment line 150-1, 150-2, 150-3, 150-4 may coincide with one, but not both, of the inward facing portion group alignment line 140-1, 140-2, 140-3, 140-4 and outward facing portion group alignment line 130-1, 130-2, 130-3, 130-4. In this manner, each transition region filmhole group 95-1, 95-2, 95-3, and 95-4 of a filmrow 55-1, 55-2, 55-3, 55-4 may comprise filmholes disposed outward (away relative to reference edge E-E') of the innermost filmhole of one of the corresponding inward facing portion 92-1, 92-2, 92-3, 92-4 or may comprise filmholes disposed inward (nearer relative to reference edge E-E') of the outermost filmhole of the outward facing portion 90-1, 90-2, 90-3, 90-4 of each filmrow 55-1, 55-2, 55-3, 55-4, resulting in the transition region filmholes overlapping at least one of the first and second group of holes.

With reference to FIGS. 4B and 5B, for an adjacently overlapped pattern 75, the outward facing portion 90-1, 90-2, 90-3, 90-4 is collinear relative to the corresponding inward facing portion 92-1, 92-2, 92-3, 92-4 of the same filmrow 55-1, 55-2, 55-3, 55-4. In such embodiments, the transition region portion group alignment line 150-1, 150-2, 150-3, 150-4 may be offset relative to both of the inward facing portion group alignment line 140-1, 140-2, 140-3, 140-4 and outward facing portion group alignment line 130-1, 130-2, 130-3, 130-4. In this manner, each transition region filmhole group 95-1, 95-2, 95-3, and 95-4 of a filmrow 55-1, 55-2, 55-3, 55-4 may comprise filmholes disposed overlapping the mesial ends of the corresponding inward facing portion 92-1, 92-2, 92-3, 92-4 and the outward facing portion 90-1, 90-2, 90-3, 90-4 of each filmrow 55-1, 55-2, 55-3, 55-4, resulting in the transition region filmholes overlapping both the first and second group of holes.

With reference to FIGS. 4A-B and 5A-B, in various embodiments, each outward facing portion 90-1, 90-2, 90-3, 90-4, is disposed inward of each corresponding inward facing portion 92-1, 92-2, 92-3, 92-4. However, in various embodiments, each outward facing portion may be disposed outward of each corresponding inward facing portion. In various embodiments, the outward facing portion may be disposed outward of a corresponding inward facing portion of one adjacent filmrow, and inward of another adjacent filmrow. Each transition region filmhole group 95-1, 95-2, 95-3, and 95-4 may be disposed in the transition region 110-1, 110-2, 110-3, and 110-4 of the corresponding filmrow. Thus, various arrangements are contemplated as desired to facilitate substantially adequate convective and film cooling of the surface structure.

Figure 3:
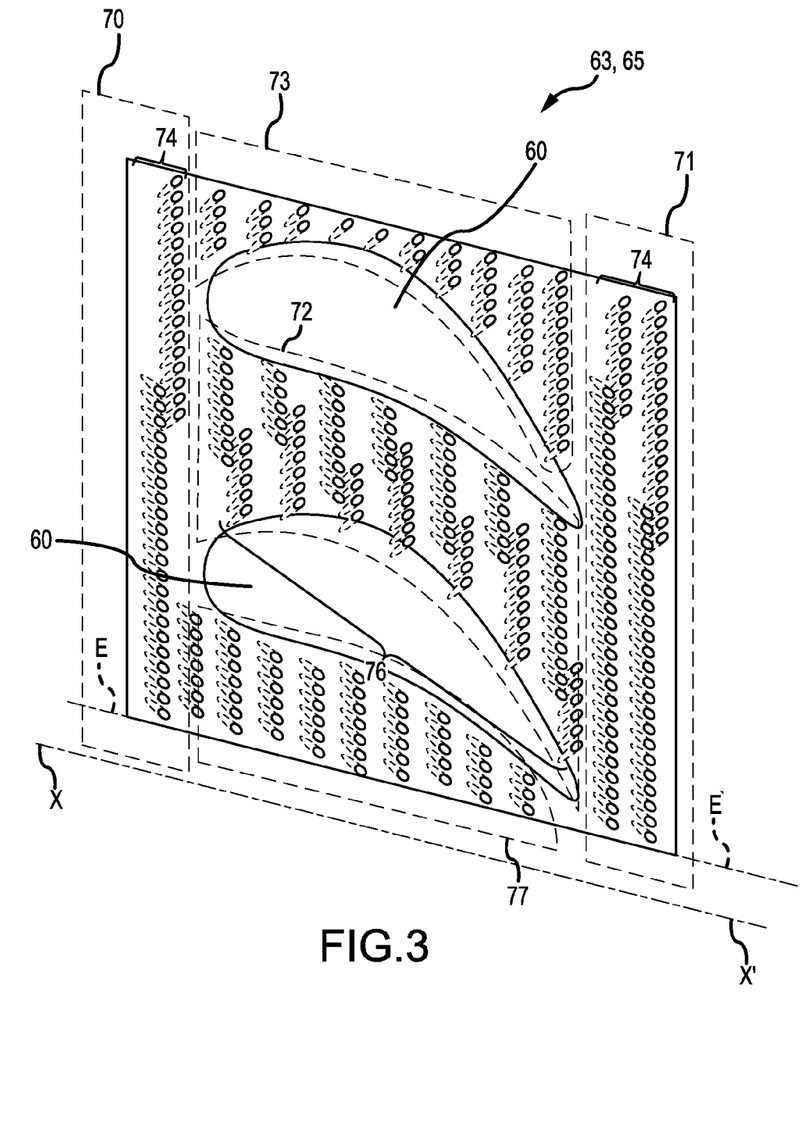
FIG. 3 illustrates an example surface structure comprising a vane platform having filmhole pattern(s), according to various embodiments.

With reference now to FIG. 3, a surface structure comprising an inner stator vane platform 65 or an outer stator vane platform 63 is disclosed. The inner stator vane platform 65 or outer stator vane platform 63 ("platform") may comprise various different filmhole groups comprising different overlapping herringbone filmhole patterns. For example, a forward portion (relative to the engine central longitudinal axis X-'X) and an aft portion (relative to the engine central longitudinal axis X-'X) may respectively comprise a forward portion filmhole group 70 and an aft portion filmhole group 71. Similarly, the circumferentially outboard (relative to one or more stator vane 60 extending from the stator vane platform) portions of the platform may comprise a first circumferentially outward portion filmhole group 73 and a second circumferentially outward portion filmhole group 77. Finally, the platform may comprise a central portion filmhole group 72, which in various embodiments may be circumferentially between a pair of stator vanes 60, and axially between the forward portion filmhole group 70 and the aft portion filmhole group 71.

Each filmhole group may include filmholes arranged according to a pattern, such as, a coaxially overlapped pattern 74, or an adjacently overlapped pattern 75, or any pattern as desired. For instance, a forward portion filmhole group 70 may comprise a coaxially overlapped pattern 74, an aft portion filmhole group 71 may comprise a coaxially overlapped pattern 74, and a central portion filmhole group 72 may comprise a reversed coaxially overlapped pattern 76, wherein a reversed coaxially overlapped pattern 76 comprises a coaxially overlapped pattern 74, except that the inward/outward orientation of the filmholes are mirrored to facilitate manufacturability, such as to permit drilling without interference with stator vanes 60. Moreover, the first circumferentially outward portion filmhole group 73 and second circumferentially outward portion filmhole group 77 may comprise filmholes positioned in collinear rows as depicted in FIG. 3.

In this manner, by implementing a variety of platform filmhole arrangements in an inner stator vane platform 65 and/or an outer stator vane platform 63, desired cooling properties may be achieved while further maintaining manufacturability, such as by permitting filmholes to be drilled, bored, or otherwise formed without interfering with stator vanes 60. In further embodiments, various features such as depicted in FIGS. 4A and 5A, for instance, an adjacently overlapped pattern 75 may further be implemented in an inner stator vane platform 65 and/or an outer stator vane platform 63, and/or any other surfaces structure discussed herein, as may be the various features depicted in FIGS. 3, 4B, and 5B. Thus, while certain filmhole arrangements are depicted in certain figures for convenience, any disclosed filmhole arrangement may be combined in any combination on any disclosed surface structure, as desired.

With reference to FIGS. 1-5B, having discussed aspects of a surface structure such as an inner stator vane platform 65, an outer stator vane platform 63, a combustor panel 62, a BOAS 66, and/or another surface structure, as desired, a surface structure may be made of various materials. For instance, a surface structure may be made of a single material, or different materials, or combinations of materials. For example, components of the system are made from metal. For example, aspects of a surface structure are metal, such as nickel, cobalt, molybdenum, titanium, aluminum, steel, or stainless steel, though it alternatively comprises numerous other materials configured to provide support. Components of the system are optionally made from other materials such as, for example, composite, ceramic, plastics, polymers, alloys, glass, binder, epoxy, polyester, acrylic, or any material or combination of materials having desired material properties, such as heat tolerance, strength, stiffness, or weight. Portions of a surface structure as disclosed herein are optionally made of different materials or combinations of materials, and/or comprise coatings. Moreover, components of the surface structure are in some instances mixtures of different materials according to different ratios, gradients, and the like.

A surface structure thus has multiple materials, or any material configuration suitable to enhance or reinforce the resiliency and/or support of the system when subjected to wear in an aircraft operating environment or to satisfy other desired electromagnetic, chemical, physical, or material properties, for example coefficient of thermal expansion, ductility, weight, flexibility, strength, or heat tolerance.

One such material is an austenitic nickel-chromium-based alloy such as Inconel®, which is available from Special Metals Corporation of New Hartford, N.Y., USA. Other such material includes ceramic matrix composite (CMC). Further material includes refractory metal, for example, an alloy of titanium, such as, titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A surface structure with an overlapping herringbone filmhole pattern having a first filmrow comprising:
   a first outward facing portion comprising filmholes oriented to direct cooling air leaving the filmholes outward of a reference edge and over a surface of the surface structure;
   a first inward facing portion comprising filmholes oriented to direct cooling air leaving the filmholes inward toward the reference edge and over the surface of the surface structure;
   wherein a majority of the filmholes of the first outward facing portion are inward of a majority of the filmholes of the first inward facing portion, wherein the inward most end of the first outward facing portion is an inward distal end and the outward most end of the first outward facing portion is a first mesial end, wherein the outward most end of the first inward facing portion is an outward distal end and the inward most end of the first inward facing portion is a second mesial end;
   a first transition region comprising a first region at least one of equidistant between the inward distal end and the outward distal end, centered relative to the first and second mesial ends, or overlapping the first and second mesial ends of the first outward facing portion and the first inward facing portion; and
   a first transition region filmhole group located in the first transition region, wherein the first transition region filmhole group comprises filmholes oriented to direct cooling air leaving the filmholes at least one of outward relative to the reference edge and over the surface of the surface structure or inward relative to the reference edge and over the surface of the surface structure;
   wherein the first outward facing portion is staggered relative to the first inward facing portion or the first transition region.

2. The surface structure according to claim 1, wherein the first transition region filmhole group is collinear with the first outward facing portion.

3. The surface structure according to claim 1, wherein the first transition region filmhole group is collinear with the first inward facing portion.

4. The surface structure according to claim 1,
   wherein a first outward facing portion group alignment line is defined through a center of each filmhole of the first outward facing portion,
   wherein a first inward facing portion group alignment line is defined through a center of each filmhole of the first inward facing portion, wherein a first transition region filmhole group alignment line is defined through a center of each filmhole of the first transition region filmhole group, wherein the first inward facing portion group alignment line is parallel to the first outward facing portion group alignment line, and wherein the first transition region filmhole group alignment line is coincident with the first inward facing portion group alignment line and is parallel to the first outward facing portion group alignment line.

5. The surface structure according to claim 1, wherein a first outward facing portion group alignment line is defined through a center of each filmhole of the first outward facing portion, wherein a first inward facing portion group alignment line is defined through a center of each filmhole of the first inward facing portion, wherein a first transition region filmhole group alignment line is defined through a center of each filmhole of the first transition region filmhole group, wherein the first inward facing portion group alignment line is parallel to the first outward facing portion group alignment line, and wherein the first transition region filmhole group alignment line is coincident with the first outward facing portion group alignment line and is parallel to the first inward facing portion group alignment line.

6. The surface structure according to claim 1, wherein the surface structure comprises at least one of an inner stator vane platform or an outer stator vane platform.

7. The surface structure according to claim 1, wherein the surface structure comprises a blade outer air seal.

8. A surface structure comprising an overlapping herringbone filmhole pattern, the overlapping herringbone filmhole pattern comprising a plurality of filmrows, each filmrow comprising an inward facing portion, an outward facing portion, and a transition region filmhole group, wherein a majority of filmholes of the outward facing portion are inward of a majority of filmholes of the inward facing portion, wherein the outward facing portion is staggered relative to the inward facing portion.

9. The surface structure according to claim 8, wherein the transition region filmhole group is collinear with at least one of the outward facing portion or the inward facing portion.

10. The surface structure according to claim 8, wherein an outward facing portion group alignment line is defined through a center of each filmhole of the outward facing portion, wherein an inward facing portion group alignment line is defined through a center of each filmhole of the inward facing portion, wherein a transition region filmhole group alignment line is defined through a center of each filmhole of the transition region filmhole group, wherein the inward facing portion group alignment line is parallel to the outward facing portion group alignment line, and wherein the transition region filmhole group alignment line is coincident with the inward facing portion group alignment line and is parallel to the outward facing portion group alignment line.

11. The surface structure according to claim 8, wherein an outward facing portion group alignment line is defined through a center of each filmhole of the outward facing portion, wherein an inward facing portion group alignment line is defined through a center of each filmhole of the inward facing portion, wherein a transition region filmhole group alignment line is defined through a center of each filmhole of the transition region filmhole group, wherein the inward facing portion group alignment line is parallel to the outward facing portion group alignment line, and wherein the transition region filmhole group alignment line is coincident with the outward facing portion group alignment line and is parallel to the inward facing portion group alignment line.

12. The surface structure according to claim 8, wherein the surface structure comprises at least one of an inner stator vane platform or an outer stator vane platform.

13. The surface structure according to claim 8, wherein the surface structure comprises a blade outer air seal.

14. The surface structure according to claim 8, wherein each filmrow comprises:

the outward facing portion, wherein the outward facing portion comprises filmholes oriented to direct cooling air leaving the filmholes outward of a reference edge and over a surface of the surface structure;

the inward facing portion, wherein the inward facing portion comprises filmholes oriented to direct cooling air leaving the filmholes inward toward the reference edge and over the surface of the surface structure;

a transition region comprising a first region equidistant from distal ends of the outward facing portion and the inward facing portion; and the transition region filmhole group, wherein the transition region filmhole group is collinear with at least one of the outward facing portion and the inward facing portion and located in the transition region, wherein the transition region filmhole group comprises filmholes oriented to direct cooling air leaving the filmholes one of outward relative to the reference edge and over the surface of the surface structure or inward relative to the reference edge and over the surface of the surface structure.

15. A method of forming a surface structure having an overlapping herringbone filmhole pattern in the surface structure comprising:

forming a first outward facing portion comprising filmholes oriented to direct cooling air leaving the filmholes outward of a reference edge and over a surface of the surface structure;

forming a first inward facing portion comprising filmholes oriented to direct cooling air leaving the filmholes inward toward the reference edge and over the surface of the surface structure; and forming a first transition region filmhole group located in a first transition region, wherein the first transition region filmhole group comprises filmholes oriented to direct cooling air leaving the filmholes at least one of outward relative to the surface structure and over the surface of the surface structure or inward relative to the surface structure and over the surface of the surface structure;

wherein a majority of the filmholes of the first outward facing portion are inward of a majority of the filmholes of the first inward facing portion, wherein the first outward facing portion is staggered relative to the first inward facing portion or the first transition region.

16. The method of forming the surface structure according to claim 15, wherein the first transition region filmhole group is collinear with at least one of: the first outward facing portion and the first inward facing portion.

17. The method of forming the surface structure according to claim 16, wherein:
the inward most end of the first outward facing portion is an inward distal end and the outward most end of the first outward facing portion is a first mesial end, wherein the outward most end of the first inward facing portion is an outward distal end and the inward most end of the first inward facing portion is a second mesial end; and
the first transition region comprises a first region at least one of between the inward distal end and the outward distal end, centered relative to the first and second mesial ends, or overlapping the first and second mesial ends of the first outward facing portion and the first inward facing portion.

18. The method of forming the surface structure according to claim 15
wherein a first outward facing portion group alingnment line is defined through a center of each filmhole of the first outward facing portion,
wherein a first inward facing portion group alignment line is defined through a center of each filmhole of the first inward facing portion,
wherein a first transition region filmhole group alignment line is defined through a center of each filmhole of the first transition region filmhole group,
wherein the first inward facing portion group alignment line is parallel to the first outward facing portion group alignment line, and
wherein the first transition region filmhole group alignment line is coincident with the first inward facing portion group alignment line and is parallel to the first outward facing portion group alignment line.

19. The method of forming the surface structure according to claim 15,
wherein a first outward facing portion group alignment line is defined through a center of each filmhole of the first outward facing portion,
wherein a first inward facing portion group alignment line is defined through a center of each filmhole of the first inward facing portion,
wherein a first transition region filmhole group alignment line is defined through a center of each filmhole of the first transition region filmhole group,
wherein the first inward facing portion group alignment line is parallel to the first outward facing portion group alignment line, and
wherein the first transition region filmhole group alignment line is coincident with the first outward facing portion group alignment line and is parallel to the first inward facing portion group alignment line.

* * * * *

UNITED STATES PATENT AND TRADEMARK OFFICE
CERTIFICATE OF CORRECTION

PATENT NO. : 9,845,693 B2
APPLICATION NO. : 14/822334
DATED : December 19, 2017
INVENTOR(S) : Spangler Page 1 of 1

It is certified that error appears in the above-identified patent and that said Letters Patent is hereby corrected as shown below:

In the Claims

Column 15, Line 37 please delete "an inward facing portion, an outward facing portion" and insert therefore -- an inward facing portion oriented to direct cooling air leaving the filmholes inward toward a reference edge and over a surface of the surface structure, an outward facing portion oriented to direct cooling air leaving the filmholes outward of the reference edge and over the surface of the surface structure --

Signed and Sealed this
Twenty-fourth Day of July, 2018

Andrei Iancu
*Director of the United States Patent and Trademark Office*